United States Statutory Invention Registration [19]

[11] Reg. Number: H658

Breckenridge et al.

[43] Published: Aug. 1, 1989

[54] HIGH EFFECTIVENESS ALL METAL HEAT EXCHANGER

[75] Inventors: Robert W. Breckenridge; Thomas P. Hosmer, both of Concord, Mass.

[73] Assignee: The United States of America as represented by the Secretary of the Air Force, Washington, D.C.

[21] Appl. No.: 209,770

[22] Filed: Jun. 22, 1988

[51] Int. Cl.[4] ..... F28F 1/42

[52] U.S. Cl. ..... 165/154; 165/164

*Primary Examiner*—Deborah L. Kyle
*Assistant Examiner*—Michael J. Carone
*Attorney, Agent, or Firm*—Richard J. Donahue; Donald J. Singer

[57] ABSTRACT

A perforated plate-spacer ring type of crossflow heat exchanger adapted for improved cryogenic operation. Plastic spacer rings have been eliminated and replaced by metallic spacer rings whose convoluted cross section provides good thermal isolation between adjacent perforated plates.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH EFFECTIVENESS ALL METAL HEAT EXCHANGER

STATEMENT OF GOVERNMENT INTEREST

The invention described herein may be manufactured and used by or for the Government for governmental purposes without the payment of any royalty thereon.

BACKGROUND OF THE INVENTION

This invention relates to heat transfer apparatus and more particularly to counterflow type heat exchangers for use in systems which provide extremely low temperatures for cryogenic devices and the like.

In the construction of a perforated plate heat exchanger of high effectiveness, it is essential to make the plates of a material that has high thermal conductivity, and the spacers between the plates of a material that has low thermal conductivity. A simple configuration for a perforated plate heat exchanger is a cylindrical stack of plates having a central axial passage separated from an annular passage by spacer rings between the plates. Such a heat exchanger is disclosed, for example, in U.S. Pat. No. 3,228,460, which is incorporated herein by reference.

In a typical embodiment, the plates are made of copper and the spacer rings are cut from sheet plastic. The spacer rings are often bonded to the plates by an epoxy adhesive. It has been found, however, that if the heat exchanger is used in a closed-cycle cryogenic system, the presence of organic substances such as plastic presents a problem, because over time, the working fluid will become contaminated by gases evolved from the plastic. These gases will freeze out on the coldest parts of the system and degrade performance. Therefore, a heat exchanger best suited for use in cryogenic systems will contain no organic materials.

OBJECTS OF THE INVENTION

The principle object of the present invention is to eliminate the aforementioned fluid contamination problem encountered with prior art heat exchangers and provide an efficient and reliable heat exchanger for use in closed-cycle cryogenic systems.

It is a further object of the present invention to provide a heat exchanger which can be economically manufactured with the assurance that each unit has substantially identical response characteristics permitting the substitution or replacement of one unit by another in any system without making compensating adjustments.

SUMMARY OF THE INVENTION

In the present invention, the plastic spacer rings generally used in prior art devices are eliminated and replaced by metallic spacer rings made of a thin metal, and having a cross-section in the form of the letter "E", similar to a metal bellows having convolutions. Thus the length of the thermal path across the spacer ring is greater than the height of the spacer ring, and the thickness of the material is less than it could practically be if the spacer ring were of a simple tubular shape, with the result that the thermal conduction across the spacer ring is fairly low. Because the height of the "E-shaped" spacer ring is relatively small, it is possible to build a high effectiveness all-metal heat exchanger of moderate length.

DETAILED DESCRIPTION OF THE INVENTION

Figure 1:
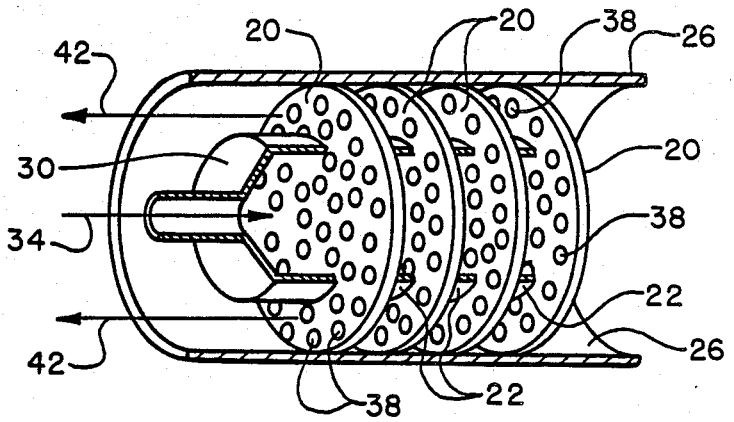
FIG. 1 (PRIOR ART)
FIG. 1 is a partially cutaway perspective drawing of a perforated plate-spacer ring type of counterflow heat exchanger known in the art.

Referring now to FIG. 1 of the drawings, there is depicted a counterflow heat exchanger whose basic design is presently known in the art. Portions of the heat exchanger have been cut away in FIG. 1 in order to better disclose its various internal features and describe the operation thereof.

This type of counterflow heat exchanger consists of perforated metal plates 20, which are separated by spacer rings 22, and are enclosed in a tubular stainless steel shell 26. Spacer rings 22, which are formed of plastic material, are adhesive-bonded to the plates 20, provide thermal isolation between adjacent plates 20, and define the gas flow passages. A header 30 is bonded to the first perforated plate 20.

In operation, heat flows from one fluid stream, whose location and direction are depicted by the arrow 34, to the plates 20, with most of the heat transfer taking place in the periphery of holes 38 in plates 20. This heat then flows laterally in the plates 20, across the seal zone, and into the counterflowing fluid stream whose location and direction are depicted herein by the arrows 42.

A typical high-effectiveness heat exchanger may have on the order of two hundred such perforated plates 20 and spacer rings 22. The use of plastic for the spacer rings 22 results in a design which has very low end-to-end heat leakage, but which also has the potential to outgas absorbed moisture and/or organic materials that can freeze out in expansion engines.

Figure 2:
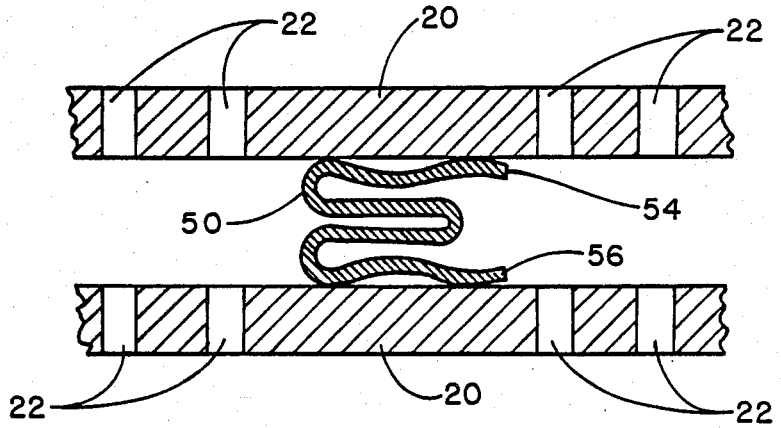
FIG. 2 is a cross-sectional view of a pair of adjacent perforated plates joined by the E-shaped ring used in the heat exchanger of the present invention.

FIG. 2 depicts a cross-sectional view of a portion of a pair of perforated plates 20 joined by one of the convoluted and substantially E-shaped spacer rings 50 used in the present invention. The free ends 54 and 56 of spacer ring 50 are preferably located at the inner diameter of ring 50, although the reversed arrangement would also provide satisfactory performance of the heat exchanger. Such an E-shaped spacer ring, called an "E-seal", is manufactured and sold by Pressure Science, Inc., of Beltsville, MD. and a customized version thereof is made of 0.006 inch thick stainless steel. This convoluted construction of spacer ring 50 results in a relatively long conduction path for a given axial length, so that good thermal isolation between plates 20 (and hence low end-to-end heat leakage) is obtained at reasonable lengths. The pattern of holes 22 in plate 20 is arranged so that there are no holes 22 in the region where plates 20 contact spacer rings 50.

The method of sealing spacer rings 50 to the plates 20 depends upon the requirement for leak-tightness between flowpaths. A reasonably leak-tight test assembly has been made using indium-plated spacer rings 50 and clamping the stack together in a fixture. Another test assembly has been made by plating the plates 20 and the spacer rings 50 with soft solder, assembling the stack, and heating the assembly to bond the parts together. The unperforated sealing areas of plates 20 may be plated with tin or indium, if necessary, to enhance sealing.

Although the invention has been described with reference to a particular embodiment thereof, it will be understood to those skilled in the art that the invention is capable of a variety of alternative embodiments within the spirit and scope of the appended claim.

What is claimed is:

1. A counterflow type heat exchanger adapted for improved cryogenic operation comprising:

a cylindrical metallic shell;

a plurality of flat circular plates each having perforations therethrough;

a plurality of metallic spacer rings;

each of said plurality of circular plates having their flat surfaces arranged in parallel along the length of said shell and having their circular edges abutting the inner wall of said cylindrical shell;

adjacent ones of said plurality of circular plates being separated by one of said plurality of spacer rings disposed concentrically therebetween to form isolated axial and annular flow paths for fluids through said shell;

each of said plurality of metallic spacer rings having a convoluted and E-shaped cross section for providing increased thermal isolation between adjacent ones of said plurality of cylindrical plates.

* * * * *